United States Patent [19]

Kawase

[11] Patent Number: 4,916,563
[45] Date of Patent: Apr. 10, 1990

[54] MAGNETIC HEAD AND METHOD FOR THE PRODUCTION THEREOF

[75] Inventor: Masahiro Kawase, Chichibu, Japan
[73] Assignee: Canon Denshi Kabushiki Kaisha, Chichibu, Japan
[21] Appl. No.: 130,160
[22] Filed: Dec. 8, 1987

[30] Foreign Application Priority Data

Dec. 9, 1986 [JP] Japan .................. 61-293156

[51] Int. Cl.⁴ .............................................. G11B 5/187
[52] U.S. Cl. ................................... 360/122; 360/119
[58] Field of Search .................. 360/122, 119, 125–127

[56] References Cited

U.S. PATENT DOCUMENTS

| | | | |
|---|---|---|---|
| 4,704,788 | 11/1987 | Eckstein | 360/122 |
| 4,755,899 | 7/1988 | Kobayashi et al. | 360/122 |
| 4,766,039 | 8/1988 | Otomo et al. | 360/126 |

FOREIGN PATENT DOCUMENTS

| | | | |
|---|---|---|---|
| 0125891 | 11/1984 | European Pat. Off. | 360/122 |
| 0175050 | 3/1986 | European Pat. Off. | |
| 3447700 | 7/1985 | Fed. Rep. of Germany. | |
| 0170010 | 9/1985 | Japan | 360/122 |
| 1182616 | 8/1986 | Japan | 360/122 |
| 0271213 | 11/1987 | Japan | 360/122 |

Primary Examiner—David J. Severin
Attorney, Agent, or Firm—Spencer & Frank

[57] ABSTRACT

In a magnetic head of the type comprising a pair of core halves which are disposed in opposing and aligned relationship leaving a magnetic gap therebetween, a magnetic-gap-defining surface of at least one core block being deposited with a thin magnetic film, grooves are formed in order to define the length of the magnetic gap at the recording medium sliding surface; a first nonmagnetic material is filled at the bottom portion of each groove and filling a second nonmagnetic material having a low melting point with respect to that of the first nonmagnetic material in the remaining portion of each groove. The nonmagnetic material having a relatively high melting point is disposed at both sides of the magnetic gap so that nonuniform wear of a portion in the vicinity of the magnetic gap can be substantially avoided. In addition, the nonmagnetic material having a low melting point is disposed at a portion which is spaced apart from the magnetic gap by a small distance so that the bonding of a pair of core halves becomes reliable.

7 Claims, 8 Drawing Sheets

Fig. 6B

MAGNETIC HEAD AND METHOD FOR THE PRODUCTION THEREOF

BACKGROUND OF THE INVENTION

1. Field of the Invention

The present invention relates to a magnetic head and a method for the production thereof and more particularly to a magnetic head of the type in which a pair of core halves which are mainly made of magnetic oxide materials and at least one of which has a magnetic-gap-defining surface coated with a thin metal magnetic film are disposed in opposed relationship leaving a magnetic gap therebetween and a method for the production thereof.

2. Description of the Prior Art

Recently, magnetic recording media are increasingly intensively magnetized with an increase of the data packaging density. Therefore, in order to be compatible with magnetic media having such a high degree of coercive force, the core materials of the magnetic heads are increasingly made of Fe-Al-Si system alloys, amorphous magnetic materials such as Co-Zn-Nb systems and the like all having a high degree of magnetic flux density. In general, such metallic magnetic materials exhibit a high degree of high-frequency losses due to eddy current so that when a magnetic circuit of a magnetic head is composed only of such metallic magnetic materials, the reproduce efficiency drops in the high-frequency range. As a result, in order to compensate for high-frequency losses, there has been proposed a method for establishing a magnetic circuit by a combination of magnetic oxide materials having a high degree of high-frequency characteristics such as ferrites and metallic magnetic materials.

Figure 1A:
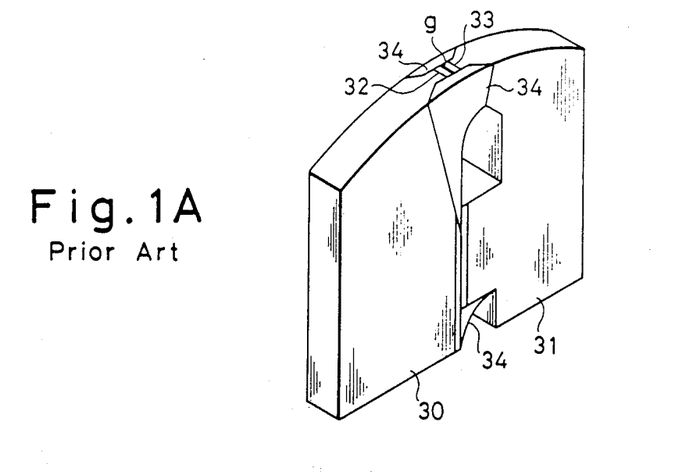
FIG. 1A is a perspective view of a conventional magnetic head.
Figure 1B:
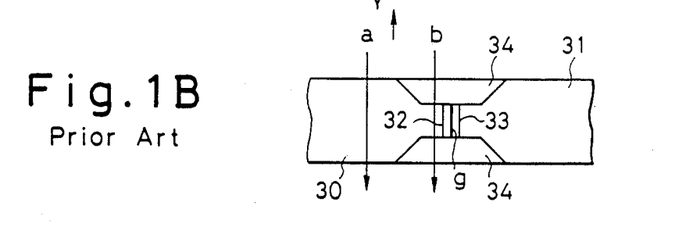
FIG. 1B is a top view of the conventional magnetic head of FIG. 1A illustrating the recording-medium-sliding surface thereof.
Figure 1C:
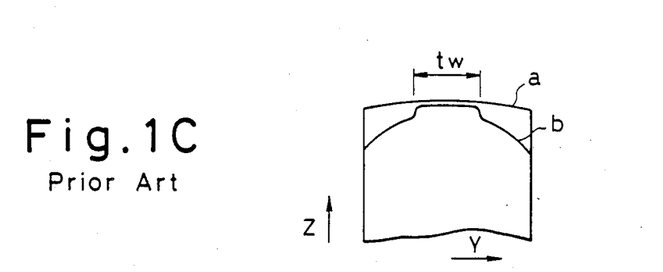
FIG. 1C is a sectional view of the conventional magnetic head used to explain wear thereof.

For instance, a magnetic head having a construction as shown in FIGS. 1A-1C recently has been proposed. FIG. 1A is a perspective view of a conventional magnetic head of the type described above; FIG. 1B shows a sliding surface for a magnetic recording medium; and FIG. 1C is a composite sectional view illustrating a degree of wear of the magnetic head.

This magnetic head comprises a pair of magnetic core halves 30 and 31 which are mainly made of ferromagnetic oxide materials such as a Mn-Zn ferrite (to be referred to as "ferrites" hereinafter in this specification). Magnetic-gap forming surfaces of magnetic core halves 30 and 31 are coated with ferromagnetic metallic thin films 32 and 33 such as Sendust, Permalloy or the like by a vacuum evaporation process. Such a pair of magnetic core halves 30 and 31 are joined with each other by a molten glass 34.

In this magnetic head, a magnetic circuit in the vicinity of a magnetic gap g is established by ferromagnetic metallic thin films having a high degree of saturation magnetic flux density so that the magnetic head exhibits sufficient recording characteristics when used with recording media such as metal tapes or the like having a high degree of coercive force. Furthermore, because almost all portions of the main magnetic circuit are established by a ferrite having a high degree of high-frequency characteristics so that high efficiency reproducibility can be attained in a high-frequency range.

However, in the magnetic head described above, different ferromagnetic thin films 32 and 33 are deposited upon the ferrite as a core material, a difference in the coefficient of expansion between the thin metallic films and the ferrite core arises due to the thermal treatment steps such as a step for joining two core halves with a molten glass and the like and in the step for depositing the thin metal films, adverse effects such that residual stresses and the like also arise. As a result, a so-called false or artificial gap is produced so that the frequency characteristic of the magnetic head tends to fluctuate.

In order to overcome the above-described problems, some measures have been proposed and demonstrated: for instance, a measure of a Co-Zn-Nb system amorphous alloy film whose coefficient of expansion is substantially similar to that of the ferrite core is used, and a measure of the step for joining the two core halves with a molten glass is carried out at low temperature so that thermal distortions due to the difference in coefficient of thermal expansion are reduced to a minimum as practically as possible. The above-mentioned production methods have a common step for using glass having a low melting point which must be used when the two core halves are joined together. In the case of amorphous metal thin films, the glass melting temperature is limited because of the limit of the crystallization temperature and in general glasses having a melting temperature lower than 500° C. are used.

As described above, in the case of the magnetic head having a high degree of reproducibility when used with the above-mentioned recording media having a high coercive force; that is, in the case of the magnetic head in which a pair of core halves made of a ferrite have the magnetic-gap defining surfaces coated with a thin ferromagnetic metallic film, the butt-welding temperature for joining the core halves with a molten glass is limited in order to avoid adverse effects such as the false or artificial gap. Therefore, glass which has a low melting point and insufficient transportability and a low degree of resistance to adverse environmental effects must be used.

As a result, in the case of the magnetic head of the type as shown in FIG. 1A, wear of the glass 34 having a low melting temperature and exposed to a sliding surface of a recording medium is increased as compared with wear of the ferrite core halves 30 and 31. When the cross sections a and b of the sliding surface configurations are compared after the recording medium has been transported over the magnetic head for a long period of time, the cross section as shown in FIG. 1C is obtained so that the difference in wear becomes apparent. That is, at the cross section b shown in FIG. 1C, wear of the glass portion is fast and accordingly wear of the track portion (tw) of the center ferrite tends to increase so that the recording-medium-sliding surface is lower than that at the section a. Therefore, the portion adjacent to the magnetic gap portion g of the recording-medium-sliding surface becomes lower than the adjacent upstream and downstream portions. In addition, when the glass portions 34 which are made in contact with both ends of the magnetic gap drops, variations in spacing between the recording medium and the magnetic gap g tend to increase so that the reproduced envelop output tends to become unstable. Furthermore, the transportation of a recording medium tends to cause damages to a glass having a low melting point so that dust tends to adhere to damaged portions, resulting in the clogging of the magnetic gap.

As to the resistance to environmental condition of glass having a low melting temperature, water resistance becomes a problem. Therefore, due to the elution of Pb and Na/ from the glass the stepped portions are produced, the quality of the glass changes and discoloration results. As a result, variations in spacing between the recording medium and the recording gap tend to be increased.

SUMMARY OF THE INVENTION

In view of the above, one of the objects of the present invention is to provide a magnetic head which is so designed and constructed that nonuniform wear in the vicinity of the magnetic gap can be substantially eliminated and a method for the production thereof.

Another object of the present invention is to provide a magnetic head which can substantially eliminate variations in spacing between the recording medium and the recording gap so that the magnetic head is highly reliable and dependable in operation and a method for the production thereof.

A further object of the present invention is to provide a magnetic head in which a nonmagnetic material having a low melting point is spaced apart from the magnetic gap by a small distance so that a pair of core halves are joined together, whereby the internal stresses are not accumulated, the joint strength is not reduced and the adverse effects due to the difference in coefficient of thermal expansion between the magnetic oxide materials and the thin metallic films can be substantially eliminated.

A further object of the present invention is to provide a method for the production of the magnetic head.

In the first aspect of the present invention, a magnetic head comprises:

a pair of core halves which have magnetic-gap-defining surfaces, respectively, and at least one of which has the magnetic-gap-defining surface formed with a thin magnetic film and in which the magnetic-gap-defining surfaces are disposed in opposing and alined relationship, leaving a magnetic gap therebetween;

grooves which are extended from a medium sliding surface of the pair of core halves at which a recording medium is in contact with the medium sliding surface along the recording-gap-defining surfaces of the pair of core halves, thereby defining the length of the magnetic gap on the medium sliding surface;

a first member which is made of a first nonmagnetic material and is disposed at least at the bottom of each of the grooves; and a second member which is made of another nonmagnetic material and is disposed at a portion except that portion, in which the first nonmagnetic member is disposed, in each of the grooves, thereby bonding together the pair of core halves.

Here, the pair of core halves may have cutout portions which are formed to define the width of the medium sliding surface and to prevent the presence of the second member on the medium sliding surface.

The pair of core halves may be mainly made of a magnetic oxide material; the thin magnetic film may be formed from a metal material; and the first and second nonmagnetic materials may be a glass having a high melting point and a glass having a low melting point, respectively.

The pair of core halves may have a portion at which the pair of core halves are bonded together with the glass having a low melting point.

In the second aspect of the present invention, a magnetic head comprises:

a pair of core halves which have magnetic-gap-defining surfaces, respectively, and at least one of which has the magnetic-gap-defining surface formed with a thin magnetic film and in which the magnetic-gap-defining surfaces are disposed in opposing and alined relationship, leaving a magnetic gap therebetween;

grooves which are extended from a medium sliding surface of the pair of core halves at which a recording medium is made into contact with the medium sliding surface along the recording-gap-defining surfaces of the pair of core halves, thereby defining the length of the magnetic gap on the medium sliding surface;

a first member which is made of a first nonmagnetic material and is disposed on at least a portion of each of the grooves exposed on the medium sliding surface; and a second member which is made of another nonmagnetic material having a melting point lower than that of the first member and is disposed to bond the pair of core halves therebetween.

Here, at least one of the pair of core halves may have a winding groove for receiving therein a winding on the magnetic-gap-defining surface, and the second member may be disposed in the winding groove.

The second member may be disposed in a portion in the grooves of the pair of core halves, the first member being not arranged in the portion.

In the third aspect of the present invention, a method for the production of a magnetic head comprises the steps of:

forming on one end surface of a block consisting of a magnetic oxide material a plurality of first grooves at a predetermined pitch;

filling a first nonmagnetic material into the first grooves;

forming a thin metal film over at least a portion of the one end surface of the block consisting of a magnetic oxide material;

forming a second groove in each of the first grooves filled with the first nonmagnetic material;

assembling two magnetic blocks which are formed with the first grooves and the second grooves and whose at least one portion of the one end surface of each block is formed with the thin magnetic metal film in such a way that the thin metal films are disposed in opposing and aligned relationship and pouring a second nonmagnetic material having a melting point lower than that of the first nonmagnetic material into each of second grooves, thereby bonding the two blocks together; and cutting the magnetic block assembly at a predetermined pitch along the portions which are defined by the first grooves.

Here, a method for the production of a magnetic head may further comprise the step of forming at the predetermined pitch on one end surface of the bonded magnetic block assembly third grooves which define a sliding surface which is made into contact with a recording medium and removing the second nonmagnetic material from the medium sliding surface.

In the fourth aspect of the present invention, a method for the production of a magnetic head comprises the steps of:

forming on one end surface of a block consisting of a magnetic oxide material a plurality of grooves at a predetermined pitch;

filling a first nonmagnetic material into the grooves;

forming a thin metal film over at least a portion of the one end surface of the block consisting of a magnetic oxide material;

assembling two magnetic blocks which are formed with the grooves and whose at least one portion of the one end surface of each block is formed with the thin magnetic metal film in such a way that the thin metal films are disposed in opposing and aligned relationship and pouring a second nonmagnetic material having a melting point lower than that of the first nonmagnetic material between the two blocks, thereby bonding the two blocks together; and cutting the magnetic block assembly at a predetermined pitch along the portions which are defined by the first grooves.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 2A:
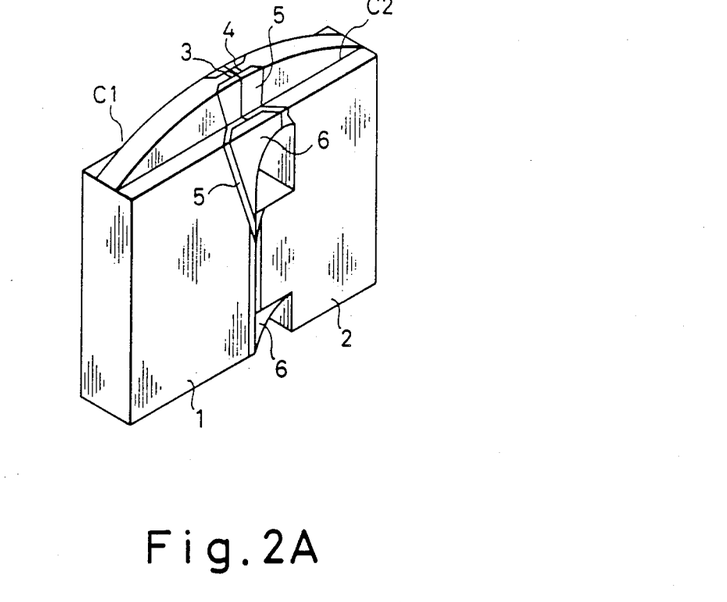
FIG. 2A is a perspective view of a preferred embodiment of a magnetic head in accordance with the present invention.
Figure 2B:
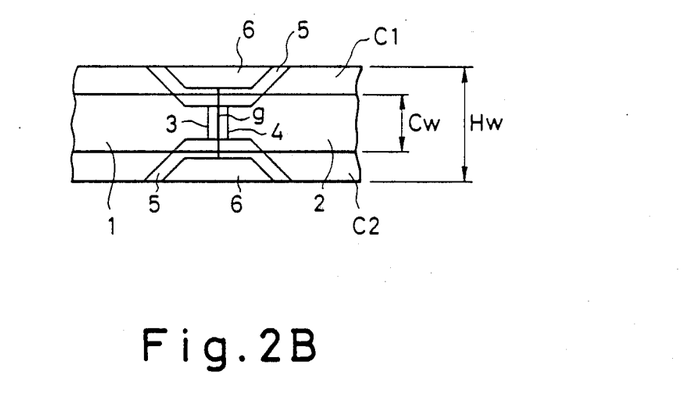
FIG. 2B is a top view of a recording-medium-sliding surface thereof.

Referring first to FIGS. 2A and 2B, a first embodiment of a magnetic head in accordance with the present invention will be described. FIG. 2A shows a perspective view of the first embodiment while FIG. 2B is a top view illustrating the recording-medium-sliding surface thereof. A pair of core halves 1 and 2 are made of a ferromagnetic oxide material such as a Mn-Zr ferrite and thin ferromagnetic films 3 and 4 are formed over the magnetic-gap-defining surfaces of the core halves 1 and 2 by a vacuum evaporation process such as a sputtering process.

As best shown in FIG. 2B, the width Cw in the direction of the recording-medium-sliding surface of the magnetic head is narrower than the width Hw of the head. In the first embodiment, the width of the sliding surface is defined by two sliding-surface-width-defining grooves C1 and C2. The same effect can be attained when the definition of the width of the sliding surface can be made by beveling or by forming surfaces inclined at a desired angle instead of the definition of the width of the sliding surface by the vertical grooves.

Track width defining grooves are formed downward from the sliding surface whose width is defined. At the bottom surface of each track width defining groove, a portion 5 of glass having a high melting or softening point is disposed along the track width defining grooves in a manner that the portion 5 is exposed to the sliding surface. A portion 6 of glass having a low melting or softening point is disposed on a groove formed by the portion 5, so that the portion 6 serves as an adhesive in the case of butt-welding of the core halves 1 and 2.

When the magnetic head is designed and constructed in the manner described above, the glass having a low melting point, a low resistance to wear and a low resistance to environmental conditions can be prevented from being exposed to the sliding surface. Furthermore, the glass which is disposed in the vicinity of a gap g of the sliding surface exhibits a high degree of resistance to wear and to environmental conditions. As a result, the present invention can provide a magnetic head which is highly reliable and dependable in operation.

Referring next to FIGS. 3A-3K, the method for the production of the magnetic head described above with reference to FIGS. 2A and 2B.

Figure 3A:
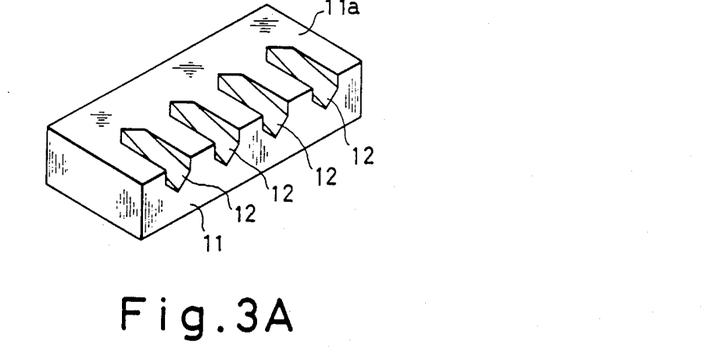
FIGS. 3A-3K are perspective views illustrating the production steps of the magnetic head shown in FIGS. 2A and 2B.

First, as shown in FIG. 3A, track-width-definition grooves 12 which are spaced apart from each other by a predetermined distance and have a predetermined width and a predetermined depth are formed in the top surface 11a of a block 11 composed of a ferromagnetic oxide material such as a Mn-Zr system ferrite.

Figure 3B:
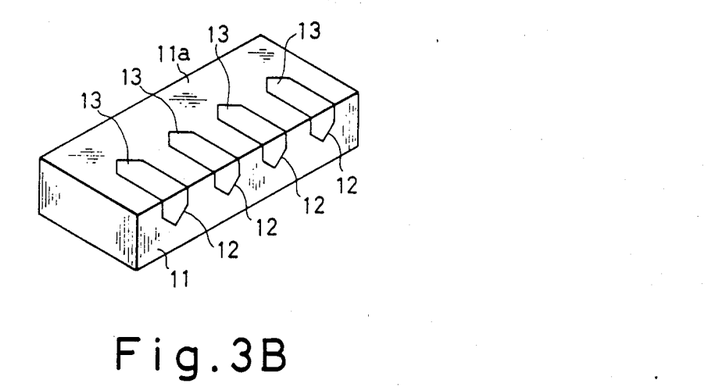

Next as shown in FIG. 3B, glass 13 which has a high melting point and is a nonmagnetic material is poured into each track-width-definition groove at 600°-800° C. until each groove 12 is completely filled with the glass 13. Thereafter, the upper surface 11a of the block 11 is ground flat, thereby removing excess glass and exposing the surface of the ferromagnetic oxide material.

Figure 3C:
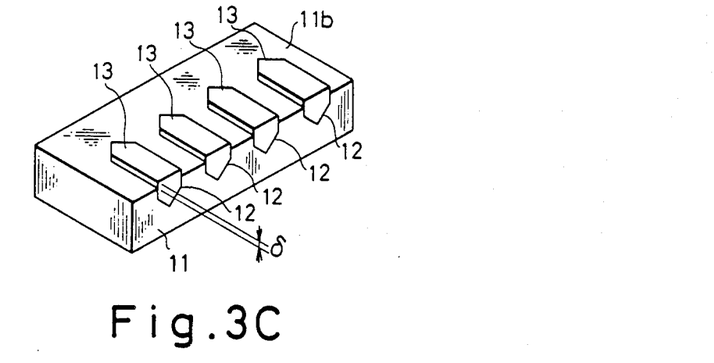

In the next step, as shown in FIG. 3C, only the ferromagnetic oxide material over the upper surface 11a of the block 11 is etched by a suitable etching process using, for example, phosphic acid so that a step $\delta$ is defined between the upper surface 11b of the ferromagnetic oxide material block 11 and the upper surface of the glass 13 having a high melting point. It is preferable that the step $\delta$ is of the order of 10-20 micrometers ($\mu$m) from the standpoint of the flow of a thin film at each corner and the thickness and step of a thin ferromagnetic metallic film to be described below.

Figure 3D:
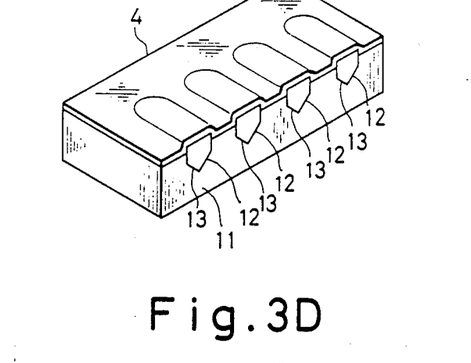

As shown in FIG. 3D, a Co-Zr-Nb system thin metallic film 14 is deposited over the top surface 11b of the ferromagnetic oxide block 11 and the upper surface of the glass 13 having a high melting point by a vacuum evaporation process such as a sputtering process. In the first embodiment, the thickness of thus formed thin film is about 15 $\mu$m.

In addition to the ferromagnetic amorphous alloy of the Co-Zr-Nb system, a Fe-Al-Si alloy system, a Fe-Si alloy system, or Permalloy or the like may be used as a material of the magnetic metal thin film 14.

Figure 3E:
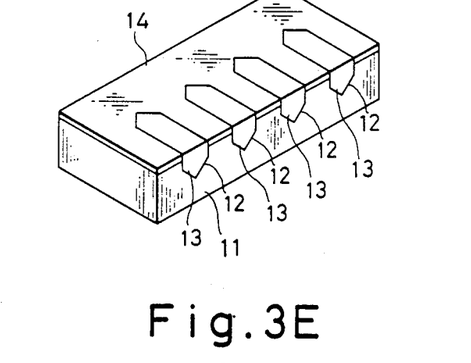

Next as shown in FIG. 3E, the upper surface of the thin ferromagnetic metal film 14 is ground flat by a lapping machine or the like so that the glass 13 having a high melting point is exposed to the upper surface 11b of the block 11 and the upper surface of the block 11 becomes completely flat without leaving any step.

Figure 3F:
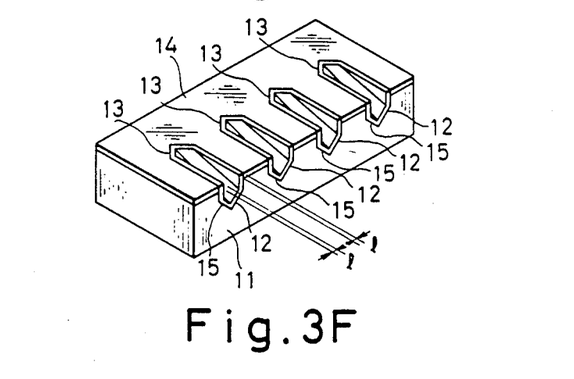
Figure 3G:
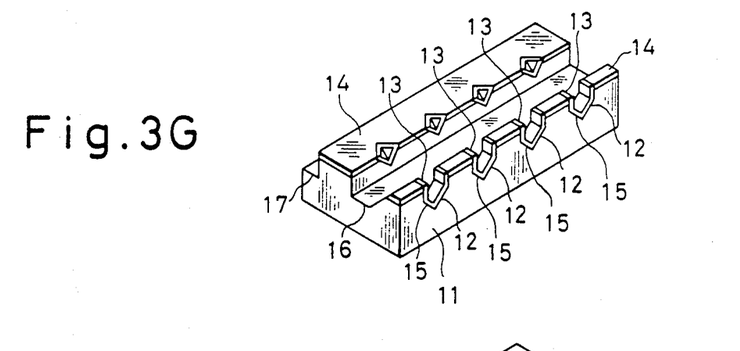

Thereafter, as shown in FIG. 3F, the glass 13 having a high melting point and exposed at the upper surface of the upper surface of the block 11 is removed by a grinding machine or the like in such a way that only portions 1 in width remain on both sides of the track-width-defining groove, whereby a groove 15 for butt-welding is newly defined. The remaining width 1 of the glass 13 having a high-melting point at each side of the groove 15 is preferably of the order of 20-100$\mu$m in consideration of the width of the glass having a high melting point and exposed to the sliding surface when the magnetic head is completely finished and the strength of the bond attained by the glass having a low-melting point. A pair of core blocks are fabricated in the manner described above and as shown in FIG. 3G at least one of the core blocks is formed with a groove 16 for receiving therein a winding and with a rear glass collection groove 17.

Figure 3H:
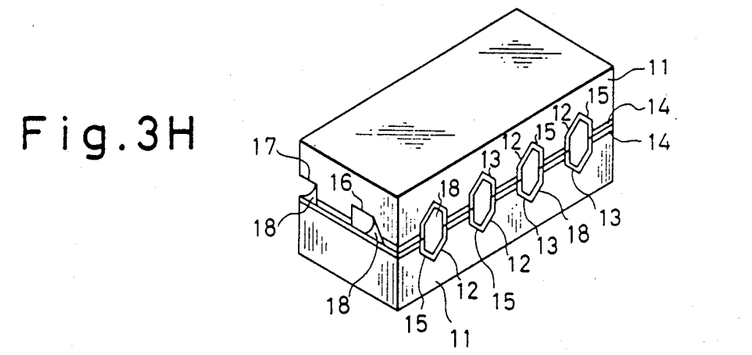
Figure 3I:
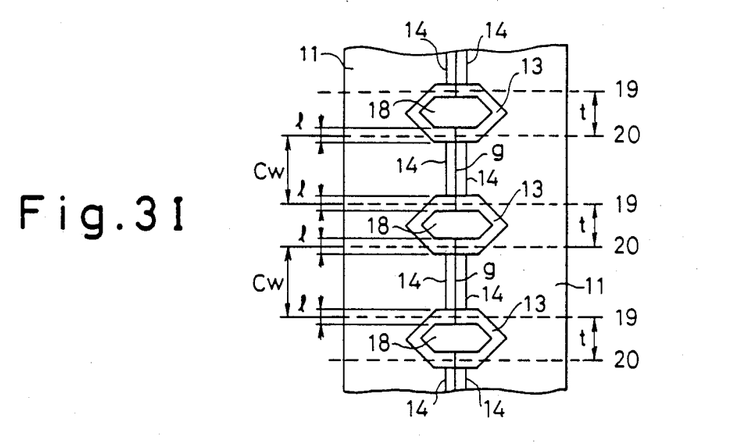

Next as shown in FIGS. 3H and 3I, a gap spacer made of a nonmagnetic material such as $SiO_2$ is formed in a desired thickness and over a desired length over the upper surface or a magnetic gap definition surface of at least one of the pair of core blocks.

The pair of core blocks at least one of which has the opposing surface coated with the gap spacer as described above are superposed one upon another as shown in FIGS. 3H and 3I in such a way that the thin ferromagnetic metal films which are sandwiched between the adjacent track-width-defining grooves 12 can be abutted against each other (or aligned with each other leaving a magnetic gap therebetween) with a high degree of accuracy. Then, molten glass having a low melting point is poured into the rear glass groove 17 and the butt-welding grooves 15 at a temperature lower than 500° C., whereby the pair of core blocks are securely bonded to each other as shown in FIG. 3H. In the case of a thin magnetic metal film made of an amorphous magnetic material, the conditions under which the glass 18 having a low melting point is used are preferably selected depending upon the crystallization temperature of the amorphous magnetic material and the softening point of the glass having a high melting point used. In this case, it should be noted that it is preferable that care is taken so that the grooves 16 and 17 are not completely filled with the glass 18 having a low melting point, in order to simplify the coil winding step.

Figure 3J:
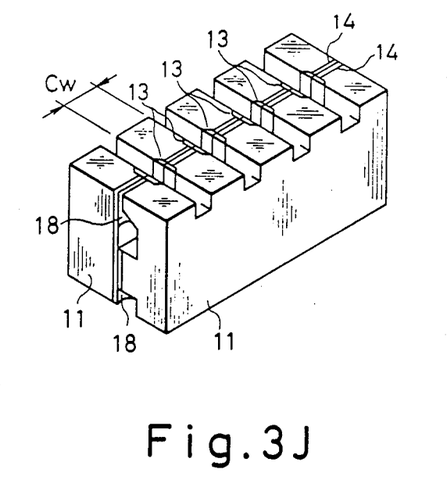
Figure 3K:
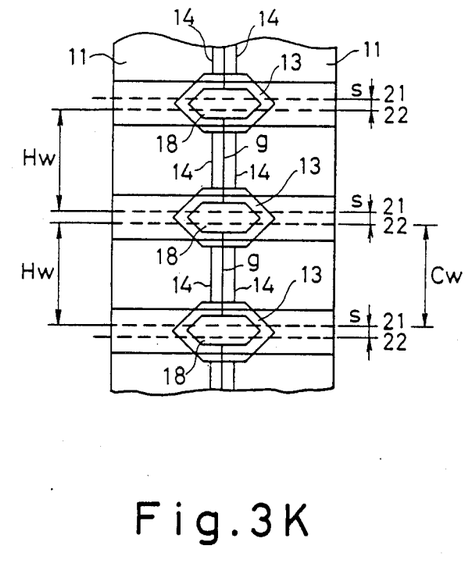

Thereafter, the pair of core blocks thus bonded together is ground by a cylindrical grinding machine and the recording medium sliding surface is ground flat by a grinding machine in such a way that the gap has a predetermined depth. Next as shown in FIG. 3I, a portion t between the broken lines 19 and 20 extended through the width l of the glass 13 having a high melting point is ground by a grinding machine to a depth slightly deeper than the depth of the magnetic gap. In FIGS. 3I and 3J, reference mark Cw represent the width of the recording medium sliding surface after the portion t between the broken lines 19 and 20 has been removed. FIG. 3J is a view of the core block after the portion t has been removed when viewed from the side of the recording medium sliding surface. The groove left after the removal of the portion t becomes a sliding-surface-width defining groove. Thereafter, top surfaces having width Cw shown in FIG. 3J are formed in an arc shape. Next, as shown in FIG. 3K, the portion S between the broken lines 21 and 22 extended inside the groove 15 poured with the glass having a low softening point is completely cut to the bottom of the core block by a wire saw or a tool having cutting edges around its periphery, whereby the magnetic head chip as shown in FIGS. 2A and 2B can be obtained. In FIG. 3K, reference letter Hw denotes the whole thickness of the head chip completely cut off.

As described above, the magnetic head produced in the manner described above, prior to the formation of a thin ferromagnetic metal film, the glass having a high softening temperature is filled into the track-width-defining groove so that the portion in the vicinity of the magnetic gap is protected by the glass having a high melting point and consequently the operation of the magnetic head at a high degree of reliability in operation can be ensured. Furthermore, the glass having a low melting point which is used as an adhesive or a bonding agent flows into the groove formed inside of the track-width-defining groove embedded in the glass having a high melting point so that a satisfactory bonding strength can be attained.

That is, according to the present invention, the portion 6 (FIG. 2A) which is defined by the pouring of the glass 18 (FIG. 3H) having a low temperature 18 is located at a position which is spaced apart from the magnetic-gap-definition surfaces only by a small distance so that a satisfactory degree of bonding strength of a bonding can be attained and a high degree of reliability of the magnetic gap can be ensured.

In addition, the portion 6 of the glass 18 having a low melting point within the portion 5 of the glass having a high temperature in the track-width-defining groove is not directly exposed to the recording-medium sliding surface because of the provision of the sliding-surface-width-defining groove so that the problems of the steps and variations in quality which are encountered in the prior art magnetic recording heads can be substantially overcome.

Figure 4:
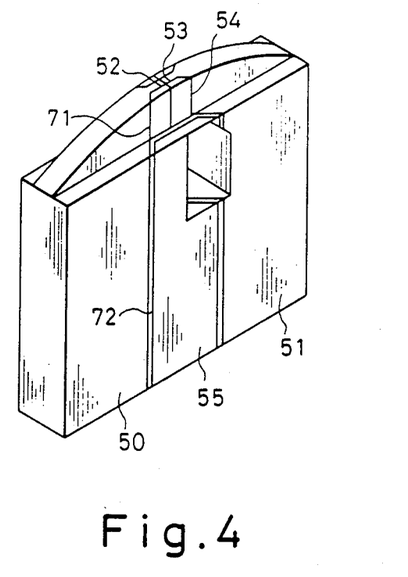
FIGS. 4, 5, 6A and 6B are views illustrating further embodiments of the present invention.

In the first embodiment described above, the track-width-defining grooves are formed in such a way that they are inclined at a desired angle with respect to the top surface of the block of a magnetic oxide material as shown in FIG. 3A. But when the track-width-defining grooves 12 are formed in the upper surface of the block in such a way that the bottoms of the grooves 12 are in parallel with the top surface of the block and have the same depth throughout their length and when the bottoms of the bonding grooves 15 for the glass having a low melting point are made in parallel with the top surface of the block in the step shown in FIG. 3F, the construction consisting of two core halves 50 and 51 can be obtained as shown in FIG. 4. Therefore, it becomes possible to have a construction in which a track-width-defining groove 71 and a binding or joining portion 72 which defines a portion 55 of a glass having a low melting point are in parallel with each other. In FIG. 4, reference numerals 52 and 53 denote thin ferromagnetic metal films formed over the magnetic-gap-defining surfaces, respectively, of the core halves 50 and 51; and 54, a portion of a glass having a high melting temperature.

Figure 5:
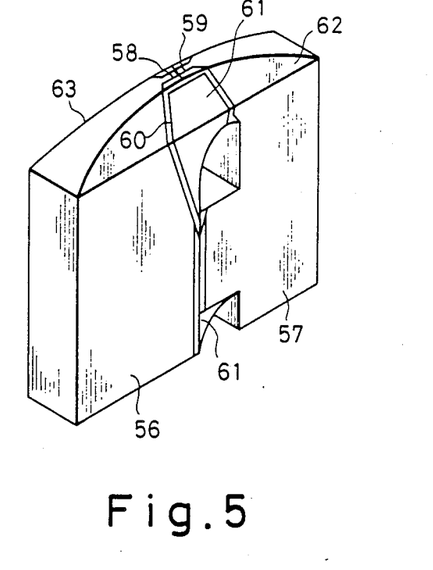

Another method for defining the width of the sliding surface is to use a grinding wheel adapted to forming a V-shaped groove in the step shown in FIG. 3I so that the width of the sliding surface can be defined by inclined surfaces 62 and 63 as shown in FIG. 5. In FIG. 5, reference numerals 56 and 57 represent core halves, respectively; 58 and 59 thin ferromagnetic metal films formed over the magnetic-gap-defining surfaces, respectively, of the core halves 56 and 57; and 60 and 61, the portion of a glass having a high temperature and the portion of a glass having a low temperature, respectively.

Figure 6A:
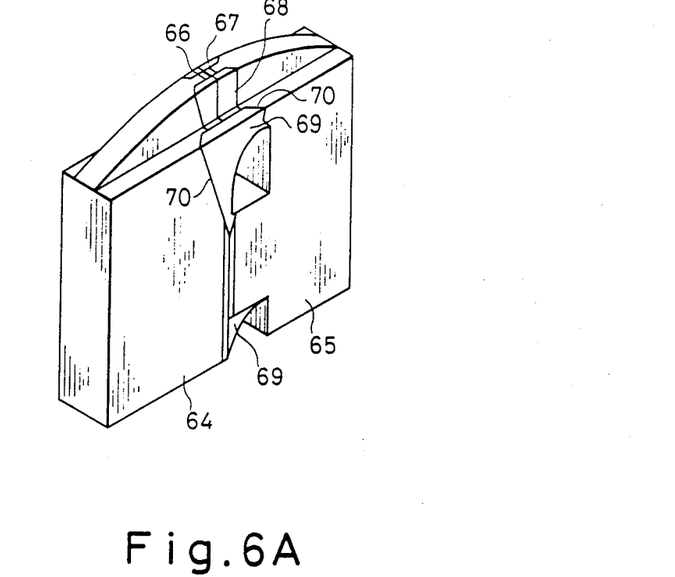
Figure 6B:
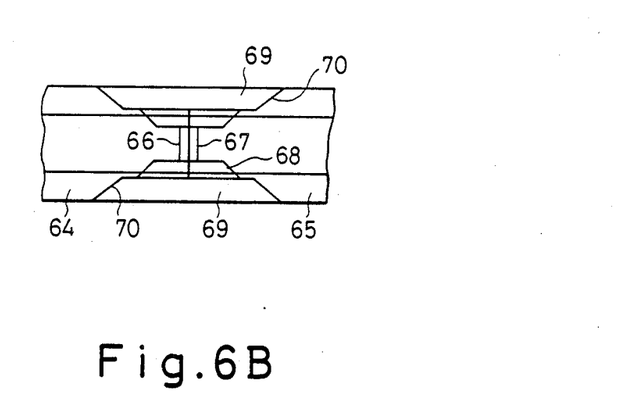

Furthermore, in the case of changing the bonding groove with a glass having a low melting temperature into the track-width-defining groove filled with a glass having a high melting temperature, when the depth of cut perpendicular to the upper surface of the block is so determined to reach a ferromagnetic oxide material in the step 3F, it becomes possible to provide a magnetic head whose perspective view is shown in FIG. 6A and whose recording-medium sliding surface is shown in FIG. 6B. In the case of the embodiment of the type just described above with reference to FIGS. 6A and 6B, reference numerals 64 and 65 represent core halves; 66 and 67, thin ferromagnetic metal films formed over the magnetic-gap-defining surfaces of the core halves 64 and 65, respectively; 68 and 69, a portion of a glass having a high melting point and a portion of a glass having a low melting point, respectively; and 70, a bonding groove for defining the portion 69 of the glass having a low melting temperature.

In the case of the magnetic head with the above-described construction, the portion 69 of the glass having a low temperature is directly made into contact with the core halves made of a ferromagnetic oxide material so that the strength of a bonding can be further enhanced.

According to the preferred embodiments of the present invention described above, the glass portion 5, 54, 60 or 68 of the glass which is a first nonmagnetic material and has a high melting point is disposed in the track-width-defining groove exposed to the sliding surface which in turn is defined by the sliding-surface-width-defining grooves so that the problems such as nonuniform wear, variations in quality at high temperature and at high humidity, decolorization and so on which are encountered in the prior art recording heads can be substantially overcome.

Furthermore, the glass 18 having a low melting temperature which is used as an adhesive or a bonding agent is poured into the track-width-defining grooves which are not directly exposed to the sliding surface due to the provision of the track-width-defining grooves, a high degree of bonding strength can be ensured and the magnetic gap remains in a stable state.

According to the method for the production of magnetic heads in accordance with the present invention, the glass 13 having a high melting point is filled into the track-width-defining grooves formed over the upper surface of the block and the thin ferromagnetic metal films are formed over the magnetic-gap-defining surfaces. Furthermore, after a pair of magnetic core blocks are fabricated through various production steps, the glass 18 having a low melting temperature is used to effect the butt-welding between the thin ferromagnetic metal films so that after the formation of the thin ferromagnetic thin metal films, there exists no step in which the magnetic core blocks are exposed to high temperatures so that the problem caused by the difference in coefficient of expansion at the interfaces between the ferromagnetic oxide material and the thin ferromagnetic metal films, the adverse effects due to the stresses in the formed thin films causing distortions thereof; and the problem of a false or artificial gap can be all substantially overcome.

In the case of the butt-welding, the grooves into which is poured the glass having a low melting point are formed inwardly of the track-width-defining grooves filled with a glass having a high melting point and the glass having a low melting point is poured into the first-mentioned grooves so that mass production in which the glass having a high melting temperature is disposed on both sides of the magnetic gap and then the glass having a low melting temperature is disposed outwardly of the glass having a high melting temperature can be carried out. As a result, the present invention can provide the magnetic heads whose machining strength is high and whose magnetic gap is maintained in a stable state.

In addition, the portions 6, 55, 61 and 69 of the glass which have a low melting point and are disposed within the track-width-defining grooves are formed by pouring the glass having a low melting point into the track-width-defining grooves defined on both sides of the sliding surface which in turn is defined when a pair of core blocks are bonded together and then forming the steps in the sliding-surface-defining grooves so that the glass having a low melting point is not directly exposed to the sliding surface. Furthermore, such magnetic heads are adapted to be fabricated by the mass production system.

As described above, according to the present invention, variations in spacing between the recording medium and the magnetic gap can be reduced to a minimum so that the magnetic head which is highly reliable and dependable in operation and can accomplish the recording and reproduction onto or from the magnetic recording media having a high degree of coercivity can be provided.

What is claimed is:

1. A magnetic head comprising:
   a pair of core halves having magnetic-gap defining surfaces, disposed in an opposing and aligned relationship with a magnetic gap therebetween at least one of said magnetic-gap-defining surfaces being provided with a thin magnetic film, said core halves having a medium sliding surface on which a recording medium slides;
   a groove, having a bottom surface, extending from said medium sliding surface along said magnetic-gap-defining surfaces, said groove defining the width of a track formed on the recording medium by said magnetic head;
   a first nonmagnetic member made of a first nonmagnetic material, said first nonmagnetic material being engaged on the bottom surface of said groove; and
   a second nonmagnetic member made of another nonmagnetic material, said second non-magnetic material being arranged on said first nonmagnetic member, thereby bonding together said pair of core halves, said pair of core halves further have cutout portions formed in said medium sliding surface to define the width of said medium sliding surface, said core halves being arranged so that a part of said first nonmagnetic member remains on said medium sliding surface and said second nonmagnetic member does not remain on said medium sliding surface.

2. A magnetic head as claimed in claim 1, wherein said pair of core halves are primarily composed of magnetic oxide material; said thin magnetic film is formed from a metal material; and said first and second nonmagnetic materials are a glass having a high melting point and a glass having a low melting point, respectively.

3. A magnetic head comprising:
   a pair of core halves having magnetic-gap-defining surfaces, disposed in an opposing and aligned relationship with a magnetic gap therebetween said core halves having a medium sliding surface on which a recording medium slides;
   a groove extending from said medium sliding surface along the magnetic-gap-defining surfaces of said pair of core halves, said groove defining the width of a track formed on the recording medium by said magnetic head;

a first nonmagnetic member made of a first nonmagnetic material, said first nonmagnetic member extending along said groove; and a second nonmagnetic member made of a second nonmagnetic material having a melting point lower than that of said first nonmagnetic material, said second nonmagnetic material extending along said groove, said pair of core halves further having cutout portions which are formed to define the width of said medium sliding surface, said core halves being arranged so that a part of said first nonmagnetic member remains on said medium sliding surface and said second nonmagnetic member does not remain on said medium sliding surface.

4. A magnetic head as claimed in claim 3, wherein at least one of said pair of core halves has a winding groove for receiving therein a winding adjacent said magnetic-gap-defining surface, and said second nonmagnetic material is further disposed in said winding groove.

5. A magnetic head as claimed in claim 4, wherein said first and second nonmagnetic members are disposed in separate portions of said groove.

6. A magnetic head comprising:

a pair of core halves separated by a gap and having magnetic-gap-defining surfaces along said gap disposed in an opposing and aligned relationship leaving a magnetic gap therebetween, at least one of said magnetic-gap-defining surfaces being formed with a thin magnetic film, said core halves having a medium sliding surface for sliding a recording medium having at least one track thereacross, said medium sliding surface accommodating one end of a groove extending from said medium sliding surface along one edge of said gap, said groove having a bottom surface at least partially formed in each of said core halves and separated into two parts by said gap;

a first nonmagnetic member made of a first nonmagnetic material and arranged on the bottom surface of said groove; and a second nonmagnetic member made of a second nonmagnetic material and arranged on said first nonmagnetic member, said second nonmagnetic material spanning said gap to bond together said pair of core halves, said pair of core halves further having cutout portions in said medium sliding surface, said cutout portions defining the width of said medium sliding surface and being arranged so that a part of said first nonmagnetic member extends to said medium sliding surface and said second nonmagnetic member does not extend to said medium sliding surface.

7. A magnetic head as defined in claim 6, further including:

a second groove extending from said medium sliding surface along the opposite edge of said gap from said groove, said second groove having a bottom surface at least partially formed in each of said core halves and separated into two parts by said gap, the extent of said gap between said grooves defining the width of said track on said recording medium.

* * * * *